Bernard J. Rosenbaum
Mike Oberschmidt
John J. Fitzgerald
INVENTORS

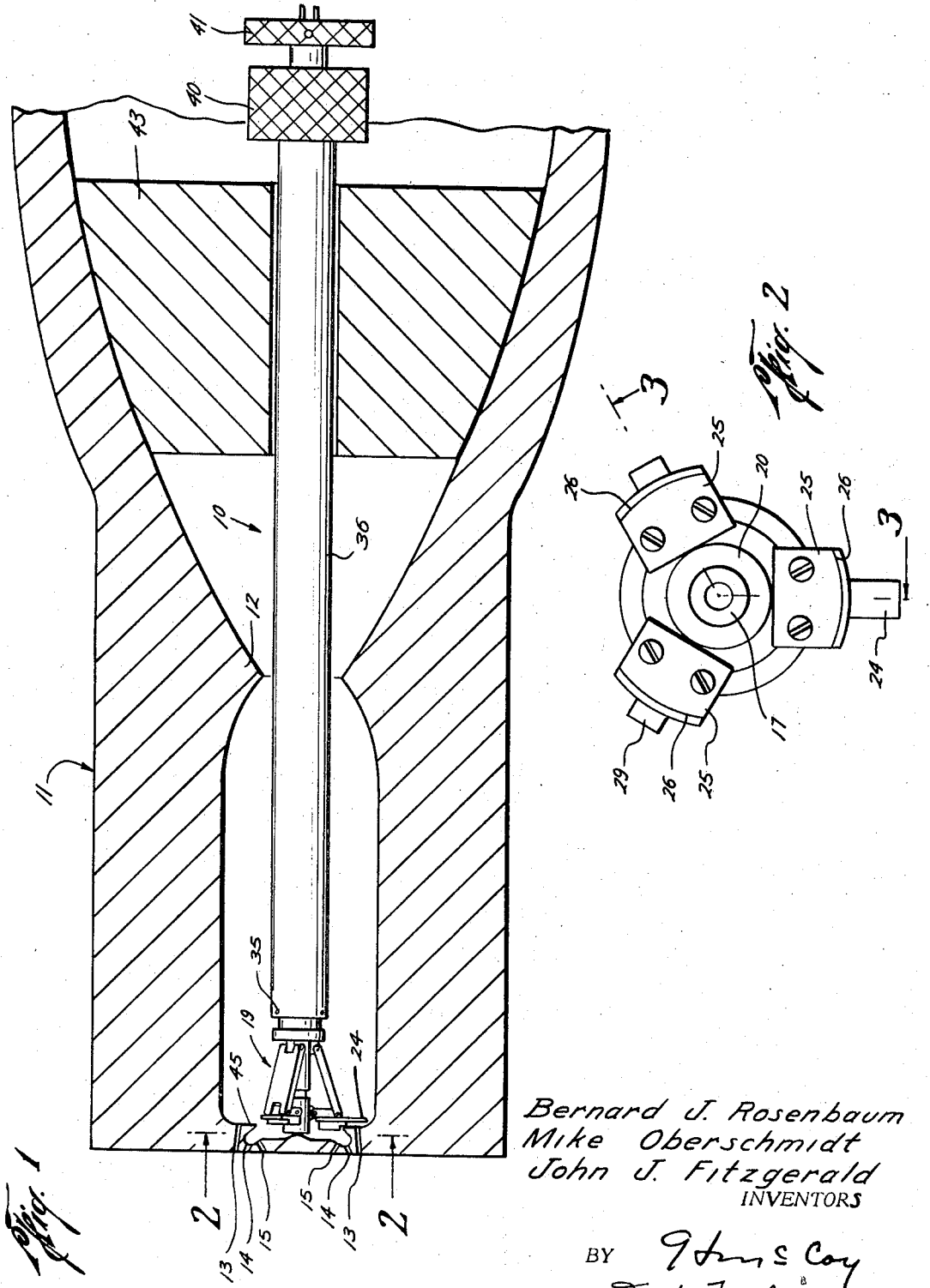

ATTORNEYS

Feb. 4, 1969  B. J. ROSENBAUM ET AL  3,425,276
FLOW TEST DEVICE

Filed Aug. 19, 1966   Sheet 3 of 3

Bernard J. Rosenbaum
Mike Oberschmidt
John J. Fitzgerald
INVENTORS

BY  9 McCoy
Dude Faulconer
ATTORNEYS

United States Patent Office 3,425,276
Patented Feb. 4, 1969

3,425,276
FLOW TEST DEVICE
Bernard J. Rosenbaum and Mike Oberschmidt, Pasadena, and John J. Fitzgerald, League City, Tex., assignors to the United States of America as represented by the Administrator of the National Aeronautics and Space Administration
Filed Aug. 19, 1966, Ser. No. 574,283
U.S. Cl. 73—198                                      7 Claims
Int. Cl. G01f 1/00

ABSTRACT OF THE DISCLOSURE

A fluid flow sensor attached to a collapsible linkage device which is insertable in its collapsed position through the restricted throat of a rocket motor combustion chamber and then externally manipulated to properly position the sensor at the various injector ports for testing fluid flow therethrough. The sensor is on one of three expandable fingers carried by a mandrel. Relative rotation between the inserted mandrel and a threaded sleeve causes the linkage to expand and position the sensor over one of the injector ports.

---

The invention described herein was made by employees of the United States Government and may be manufactured and used by or for the Government for governmental purposes without the payment of any royalties thereon or therefor.

This invention relates to a device for checking flow through passages where access to said passages is normally obstructed, and more particularly relates to a collapsible device which can be inserted through a restricted access opening and then expanded to position a flow detection means over a flow passage to check said passage for flow.

Maneuvering systems for space vehicles and the like include as a part thereof a plurality of relatively small rocket motors strategically positioned about the vehicle. These motors are relatively simple in design, and are basically comprised of an injector section and a combustion-thrust chamber section. The injector section, as the name implies, injects both propellant and oxidizer through a plurality of separate flow passages into the combustion chamber where they are mixed and ignited. The resultant gases are expelled from the combustion chamber through a restricted throat portion to thereby develop the driving thrust of the motor, as is well known in the rocket art.

In order to generate a large thrust in small motors of this type, it is necessary to use propellant which burns at an extremely high temperature. To prevent this high temperature from burning out sections of the combustion chamber wall, raw propellant is injected directly onto the wall. This relatively cool propellant lowers the wall temperature to one which allows the motor to function for extended periods of time. However, as has happened in the past, small bits of debris and the like are sometimes present in the propellant, and this foreign matter tends to clog the small diameter flow passages. This clogging results in localized high wall temperatures which in turn causes wall burn-through and hence premature engine failure.

Thus, a rocket motor of the type described above has three distinct sets of flow passages: i.e. passages for (a) primary propellant, (b) oxidizer, and (c) raw propellant. It can easily be seen that if any of these passages become blocked, or even partially obstructed, failure or at best sub-performance of the motor will result. Therefore, it is vitally important that each of said passages are checked to determine that all such passages are clear of obstructions before launching the spacecraft on which the rocket motors are mounted.

Heretofore the only known way to check these flow passages after the motors were assembled and installed was to actually test fire the motors. This procedure was necessary due to the fact that all of said passages are located at the forward, closed end of the motor with access through the aft end of the motor being obstructed by the restricted throat area. Such a test procedure not only shortens the life of the motor, but is also expensive and difficult to control, and does not in most instances provide an accurate, reliable test.

The present invention relates to a test device which is capable of accurately and reliably checking flow passages in areas where access thereto is normally obstructed, such as those passages described above. This can be done even after the rocket motors have been installed in the spacecraft. The device is comprised of a mandrel which carries a collapsible linkage assembly at its forward end. The linkage assembly in turn is comprised of a plurality of expandable, support fingers which are equidistantly spaced about the circumference of the mandrel. One of said fingers carries a transducer means attached thereto which is capable of detecting flow, while the other fingers serve as support and positioning means, as will be evident from the detailed discussion below.

By means of a sleeve which is threadably mounted on the mandrel, the linkage can be expanded after it has been inserted through the throat portion of the motor to position the transducer adjacent the flow passage to be checked. The actual flow detection is achieved by the flow impinging directly on the transducer means which causes a signal impulse to be generated which in turn is detected on an oscilloscope, or like apparatus. The transducer means can be calibrated to determine the actual flow through a particular passage, if desired. Once a particular passage has been checked, the entire device can be rotated to align the transducer means adjacent another of the passages, and this procedure repeated until all of the passages have been checked. A centering means is rotatably mounted near the after end of the sleeve to aid in centering and stabilizing the device in the motor. To remove the device, the sleeve is rotated in the opposite direction with respect to the mandrel to collapse the linkage, and the device is easily withdrawn through the throat area.

The actual construction, operation, and the apparent advantages of the invention will be better understood by referring to the drawings in which like numerals identify like parts in the different figures and in which:

FIG. 1 is a perspective view, partly in section, of the invention in place in a rocket motor;

FIG. 2 is an end view of the invention taken along line 2—2 of FIG. 1 with the motor removed;

Figure 3:
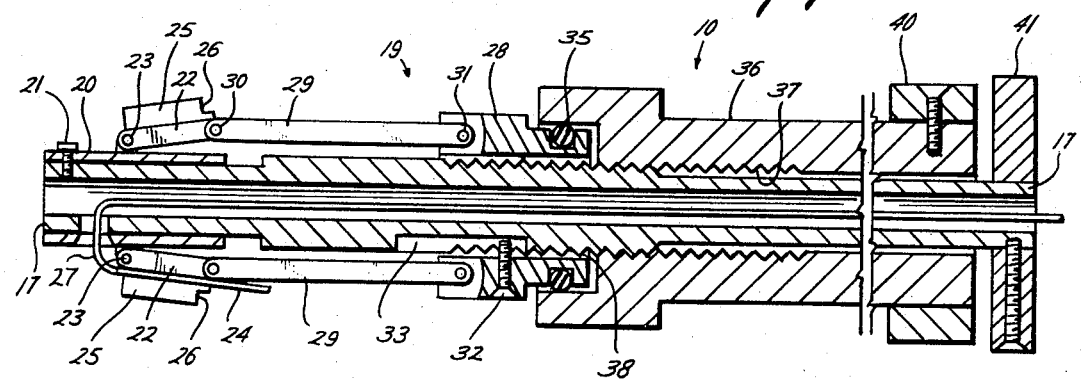
FIG. 3 is a partial, longitudinal sectional view of the invention taken along line 3—3 of FIG. 2 showing the invention in a collapsed position.

Referring more specifically to the drawings, FIG. 1 discloses test device 10 in an operable position within the combustion chamber 11 of a typical attitude control rocket motor. Motor section 11 has a restricted throat portion 12 and three separate sets of passages at its forward end, raw propellant ports 13, primary propellant ports 14, and oxidizer ports 15. All of these ports are adapted to be coupled to an injector section (not shown) which in turn supplies the fluids to their respective ports.

Device 10 which is adapted to check flow through raw propellant ports 13 is comprised of a hollow mandrel 17 having a collapsible linkage assembly 19 secured on its forward end. Linkage assemby 19 comprises an annular collar 20 which is secured to mandrel 17 by pin 21, or the like, and which has three expandable fingers 22 pivotally secured thereto by means of pins 23. It should be recognized that while the linkage has been illustrated as having three fingers, only two, or more than three fingers, could be used without departing from the invention.

Secured along the length of one of the fingers 22 and extending outward therefrom is a transducer means 24, shown schematically. The actual construction of this transducer means can very, depending upon the type of basic detection means utilized. For example, a preferred transducer consists of a flat metal strip having a strain gauge secured by bonding or the like along the back of the unsecured portion of the strip. The basic construction of such gauges is well known in the art and has not been shown in detail for the sake of brevity. The electric connection 27 which is connected to the strain gauge passes through aligned openings in collar 20 and mandrel 17, through mandrel 17, and out the aft end thereof to a recording device (not shown).

Another example of transducer means 24 is a temperature responsive device, such as a thermocouple. In this case electrical connection 27 is adapted to be connected to a temperature recording device (not shown). The exact manner in which each of these mentioned means detect flow will be set out below in the description of operation.

Secured to each of fingers 22 by means of screws, or the like, are support blocks 25, each of which has a recessed shoulder 26. As clearly shown in FIGS. 3 and 4, block 25, which is on the same finger as transducer 24, overlies just that portion of the the transducer that is secured to finger 22. These blocks which contact the rocket motor to stabilize the test device, as will be more fully explained below, are preferably made of a non-abrasive type material such as Teflon to prevent the scratching or otherwise marring of the motor chamber.

Each of fingers 22 is connected by means of links 29 to slide 28 which in turn is slidably mounted on mandrel 17. Links 29 are pivotally secured to fingers 22 by pins 30 at one end, and to slide 28 by pins 31 at the other end. To prevent rotational movement of slide 28 with respect to mandrel 17, pin 32 is provided on slide 28 which cooperates with an elongated groove 33 in mandrel 17.

An elongated sleeve 36 is rotatably connected to slide 28 by means of pins 35 which ride in an annular groove in slide 28. This sleeve has internal threads 37 along its forward end which mate with external threads 38 on mandrel 17. Knurled knobs 40, 41 are secured to the after ends of sleeve 36 and mandrel 17, respectively, for aiding in manipulating the two, as will be explained below. A centering means 43 of Teflon, or the like, which is shaped to complement the internal surface of the after end of motor 11, is slidably and rotatably mounted on sleeve 36 to provide a means for aligning and stabilizing device 10 within motor 11. A handle or grip (not shown) can be provided on the outer side of means 43 so it can easily be removed when desired.

Figure 4:
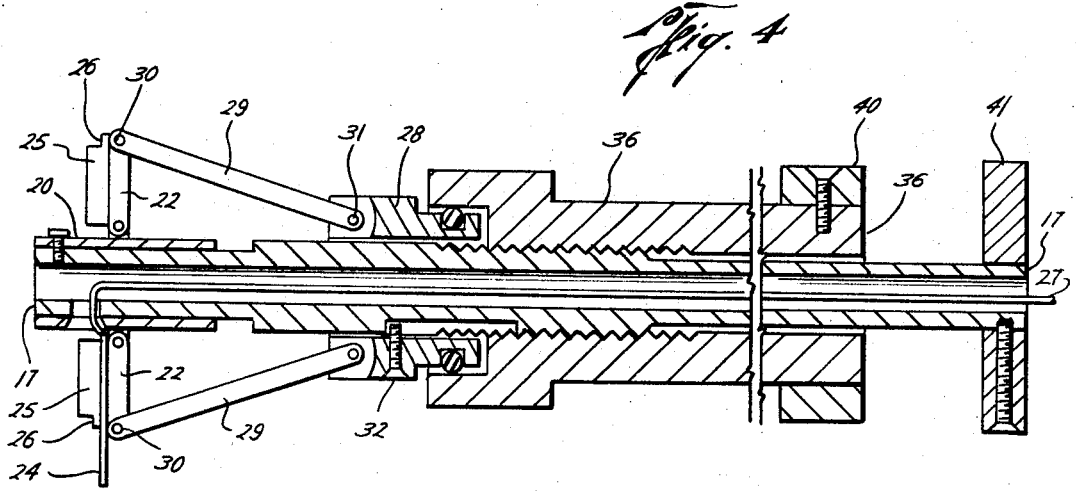
FIG. 4 is a partial, longitudinal sectional view similar to FIG. 3, showing the invention in an expanded position.

The operation of test device 10 is as follows. With device 10 in its collapsed position (FIG. 3), and with centering means 43 slidably mounted on sleeve 36, linkage assembly 19 is inserted through the restricted throat area 12 of motor 11. Centering means 43 is snugly fitted into the rear portion of motor 11, as shown in FIG. 1, to align and stabilize device 10. The knob 40 on sleeve 36 is then held with one hand while knob 41 on mandrel 17 is rotated by the other. As is seen in FIG. 4, this will cause threads 37 and 38 to cooperate to move slide 28 forward with respect to collar 20 to thereby expand fingers 22 through links 29. At this point a set screw (not shown) can be used to couple sleeve 36 to mandrel 17, if desired, so that the two will not rotate with respect to each other. Device 10 is then pushed forward until shoulder 26 on support blocks 25 contact the lip ring 45 of the motor. Now sleeve 36 and mandrel 17 are rotated as a unit until transducer 24 is positioned adjacent the passage 13 to be checked. When transducer means 24 is of the type which utilizes a strain gauge as its detection means, any flow through passage 13 will impinge on the metal strip to deflect same, thereby generating a signal in the strain gauge as is well known in the art. This signal is easily detected on an oscilloscope or the like, and clearly indicates whether or not the passage is obstructed. If a thermocouple or other temperature sensor is used, any flow impinging on the sensor will change the temperature thereof and this change is recorded on an appropriate apparatus. In either case, if the passage is obstructed no signal will be generated, or if the passage is partially obstructed, the signal will be weak.

By rotating device 10 as a unit each passage 13 can be accurately checked for flow. After all passages are checked, sleeve 36 is rotated in an opposite direction with respect to mandrel 17 to move slide 28 away from collar 20 to collapse the linkage assembly 19 and the test device can be easily removed from the motor.

Figure 6:
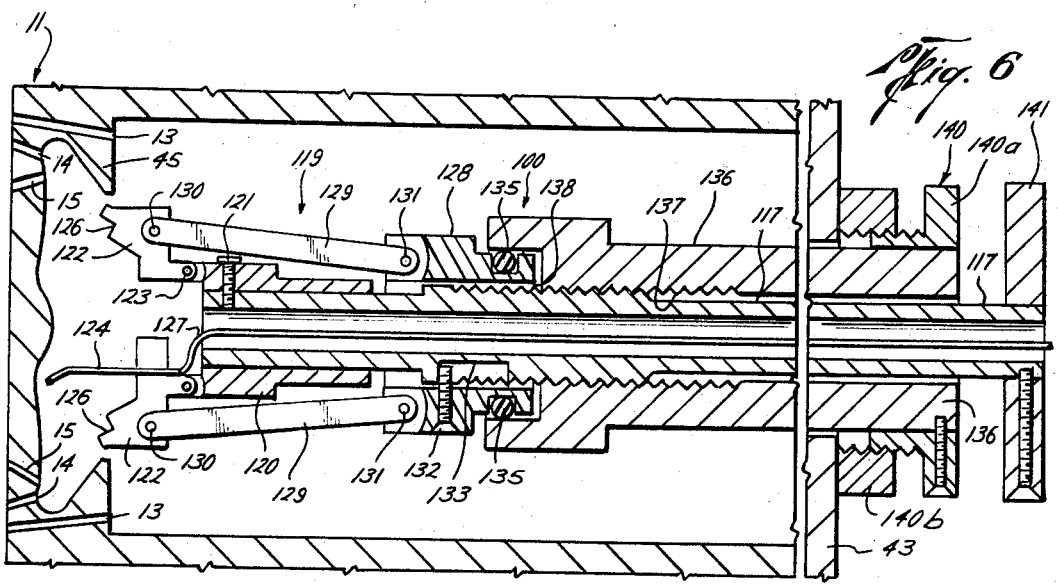
FIG. 6 is a parial, longitudinal sectional view of the invention taken along line 6—6 of FIG. 6, showing the invention in a collapsed position inside the combustion chamber of the motor.
Figure 7:
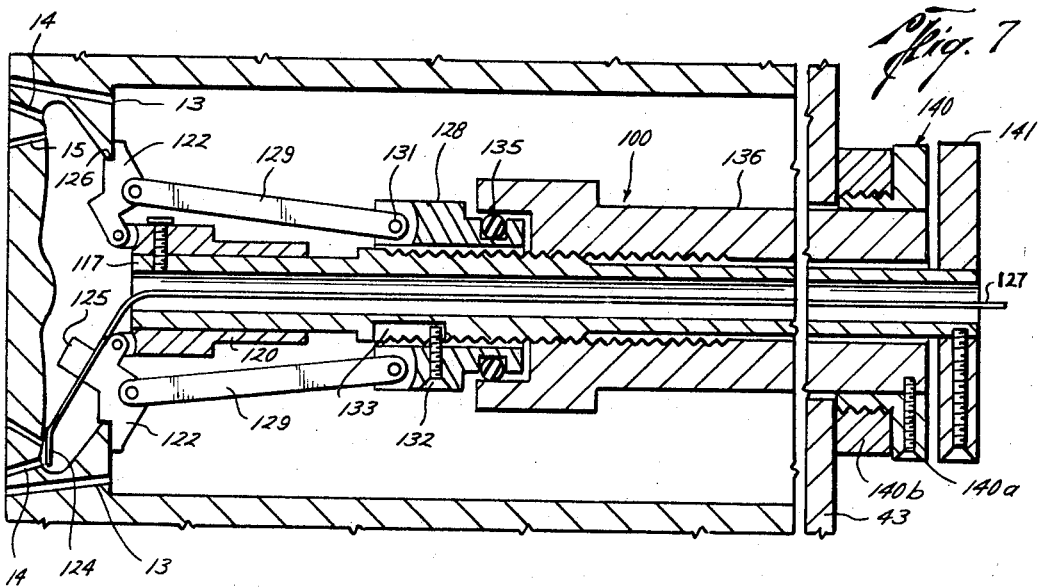
FIG. 7 is a partial, longitudinal sectional view of the invention of FIG. 6, showing the invention in an expanded position.
Figure 5:
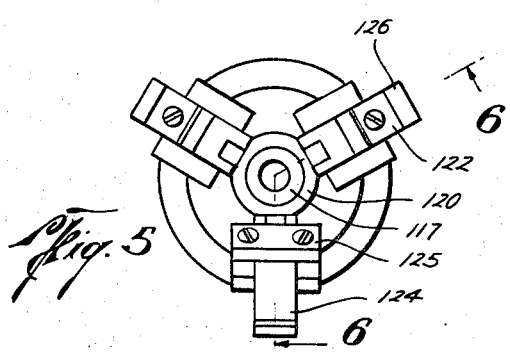
FIG. 5 is an end view of a modification of the invention.

A modified form of the present invention is disclosed in FIGS. 5 to 7. This device is used to check passages 14, 15 which are further obscured in the motor by lip ring 45. Test device 100 comprises a hollow mandrel 117 which has a collapsible linkage assembly 119 secured at its forward end. Linkage assembly 119 comprises an annular collar 120 which is secured to mandrel 117 by pin 121, and which has three expandable fingers 122 pivotally secured thereto by means of pins 123. Fingers 122 are preferably made of non-abrasive material such as Teflon, and each has a recess shoulder 126 to aid in supporting device 110 in an operable position.

Secured to one of fingers 122 by means of block 125 is a transducer means 124 constructed in the same manner as transducer 24 described above. Transducer means 24 is connected to an appropriate recording device (not shown) by means of electrical connection 127. Each of fingers 122 is connected by means of links 129 to slide 128, which in turn is slidably mounted on mandrel 117. Links 129 are pivotally secured to fingers 122 by pins 130 at one end, and to slide 128 by pins 131 at the other end. To prevent rotational movement of slide 128 with respect to mandrel 117, pin 132 is provided on slide 128 which cooperates with an elongated groove 133 in mandrel 117.

Rotatably connected to slide 128 by means of pins 135 which ride in an annular groove on slide 128, is an elongated sleeve 136. The sleeve has internal threads 137 along its forward end which mate with external threads 138 on mandrel 117. Knurled knob 141 is affixed to mandrel 117 at its after end, and a two piece knob 140 is affixed to sleeve 135. Knob 140 has a first part 140$a$ on which nut 140$b$ is threaded, the purpose of which will be explained below. Centering means 43, the same as in the first modification, is slidably mounted on sleeve 136 to align and support device 110 in an operable position.

The operation of test device 110 is as follows. With device 110 in its collapsed position (FIG. 7), assembly 119 is inserted through the restricted throat area 12 of motor 11 (see FIG. 1 for motor only). Centering means 43 is properly positioned and device 110 is pushed forward into motor 11 until nut 140$b$ abuts centering means 43. This positions linkage assembly 119 near the fore end of motor 11 (see FIG. 6), but prevents transducer 124 from being shoved into the end and thereby damaging either or both the transducer and the motor wall. While holding sleeve 136 stationary, mandrel 117 is rotated a predetermined number of turns which causes threads 137 and 138 to cooperate to move the sleeve away from collar 120 to partly expand fingers 122 through links 129. This partial expansion of linkage assembly 119 will place the recessed shoulder 126 of fingers 122 on the outer side of lip ring 45 while positioning the transducer on the inner side of 45. Next, part 140a is held while nut 140b is threaded further onto part 140a. This allows device 110 to be pushed further into motor 11. Mandrel 117 is then again rotated with respect to sleeve 126 to further expand the linkage assembly which is followed by the further threading of nut 140b onto part 140a to allow deeper penetration of device 110 into motor 11. By alternating these steps, linkage assembly 119 can be fully expanded and positioned as shown in FIG. 7 without damaging either transducer 124 or the motor walls. In actual practice, the exact number of turns of the sleeve relative to the mandrel and those of nut 140b relative to part 140a which are required at each step of expansion will be known. These factors are based on the length of the device, the depth of the lip ring, the distance traveled by one thread, rotation, etc.

The actual manner in which flow through passages 14 and 15 is checked is the same as discussed above; i.e. the flow impinges on transducer 124 to generate a signal. A single transducer such as shown in FIGS. 6 and 7 can be used to check both sets of passages if flow is alternated through first one set and then the other, or if flow through both sets of passages is simultaneous, a long transducer with the detection means at its outer end would be used for passages 14, and a shorter transducer (not shown) would be used for passages 15. To remove device 110, the sequence of steps used in expanding the linkage assembly are repeated in reverse to collapse the assembly, whereby the device can be easily withdrawn.

Although the invention has been described in conjunction with the testing of flow through the passages of a particular type of rocket motor, it should be realized that test devices made in accordance with the present invention could be used in other environments where access to passages is normally obstructed, and that the invention as set forth is intended to cover all changes and modifications which do not constitute a departure from the spirit and scope of the invention.

What is claimed and desired to be secured by Letters Patent is:

1. A device for testing passage to determine whether or not said passages are open for fluid flow wherein access to said passages is partially obstructed by a restricted opening comprising:
   an elongated mandrel having a fore end and an aft end with external threads near its fore end;
   a plurality of fingers spaced about said mandrel, each pivotally mounted at one of their ends to said mandrel near the fore end thereof;
   a slide member mounted for longitudinal movement on said mandrel;
   a plurality of link members pivotally connecting the other ends of said fingers to said slide member;
   transducer means secured to one of said fingers for detecting fluid flow and translating it into an output signal;
   means connected to said transducer means for transmitting the output signal to the aft end of said mandrel;
   an elongated sleeve having a fore end and an aft end and having internal threads near said fore end, said sleeve being telescopically mounted on said mandrel so that said threads in said sleeve will cooperate with said threads on said mandrel; and
   means rotatably connecting said sleeve at said fore end to said slide member, whereby relative rotation of said sleeve and said mandrel at their respective aft ends after insertion of the fore ends through the restricted opening will position said transducer means adjacent the passage to be checked and directly into the path of any fluid which may flow through the passage.

2. A device as set forth in claim 1 wherein said transducer means is a pressure reponsive transducer.

3. A device as set forth in claim 1 wherein said transducer means is a temperature responsive transducer.

4. A device as set forth in claim 1 including:
   a centering means mounted for longitudinal and rotational movement on said sleeve near the aft end thereof for centering and stabilizing said device in the restricted opening access area.

5. A device for testing passages to determine whether or not said passages are open for fluid flow wherein access to said passages is partially obstructed by a restricted opening comprising:
   an elongated mandrel having a fore end and an aft end, said mandrel having external threads near its fore end;
   a linkage assembly having an expanded position and a collapsed position attached to said fore end of said mandrel, said assembly having a constructive diameter when in said collapsed position small enough to pass through said restricted opening, said linkage assembly comprising:
      a plurality of fingers spaced about said mandrel, each pivotally mounted at one of their ends to said mandrel near the fore end thereof;
      a slide member mounted for longitudinal movement on said mandrel;
      cooperative means on said slide and said mandrel for restricting rotational movement of said slide with respect to said mandrel; and
      a plurality of link members pivotally connecting the other ends of said fingers to said slide members;
   transducer means secured to one of said fingers and extending outward therefrom, said transducer means detecting any flow which may impinge upon it and translating same into an output signal;
   means connected to said trasducer means for transmitting said output signal to said aft end of said mandrel;
   an elongated sleeve having a fore end and an aft end and having internal threads near its fore end, said sleeve being telescopically mounted on said mandrel so that said threads on said sleeve will cooperate with said threads on said mandrel;
   means rotatably connecting said sleeve at its fore end to said slide, whereby said sleeve can be rotated with respect to said mandrel to move said slide relative to said fingers to thereby expand said fingers to position said transducer adjacent the passage to be checked;
   centering means mounted for longitudinal and rotational movement on said sleeve near the aft end thereof for centering and stabilizing said device in the restricted opening; and
   a two-piece knob element on the aft end of said sleeve comprising:
      a first threaded part affixed to said sleeve; and
      a second threaded part threaded on said first part whereby the length of travel which said sleeve can move through said centering means in the direction of the fore end of said mandrel can vary.

6. A device as set forth in claim 5 wherein said transducer means is a pressure responsive transducer.

7. A device as set forth in claim 5 wherein said transducer means is a temperature responsive transducer.

(References on following page)

References Cited

UNITED STATES PATENTS

| | | |
|---|---|---|
| 2,067,442 | 1/1937 | Frisz. |
| 2,143,962 | 1/1939 | Stone _____ 73—198 X |
| 2,313,176 | 3/1943 | Shelby _____ 73—155 X |
| 2,805,574 | 9/1957 | Jackson et al. |
| 2,852,935 | 9/1958 | Lien. |
| 2,922,592 | 1/1960 | Kaltenbach. |
| 2,943,486 | 7/1960 | Osgood. |
| 2,983,586 | 5/1961 | Blanchard _____ 73—155 X |
| 3,050,998 | 8/1962 | Dahlke. |

RICHARD C. QUEISSER, *Primary Examiner.*

E. D. GILHOOLY, *Assistant Examiner.*

U.S. Cl. X.R.

73—116, 204, 228